March 13, 1951 S. J. GARTNER 2,545,271
GLASS COILING MACHINE

Filed May 28, 1942 5 Sheets-Sheet 1

INVENTOR
STANLEY J. GARTNER
BY John J. Rogan
ATTORNEY

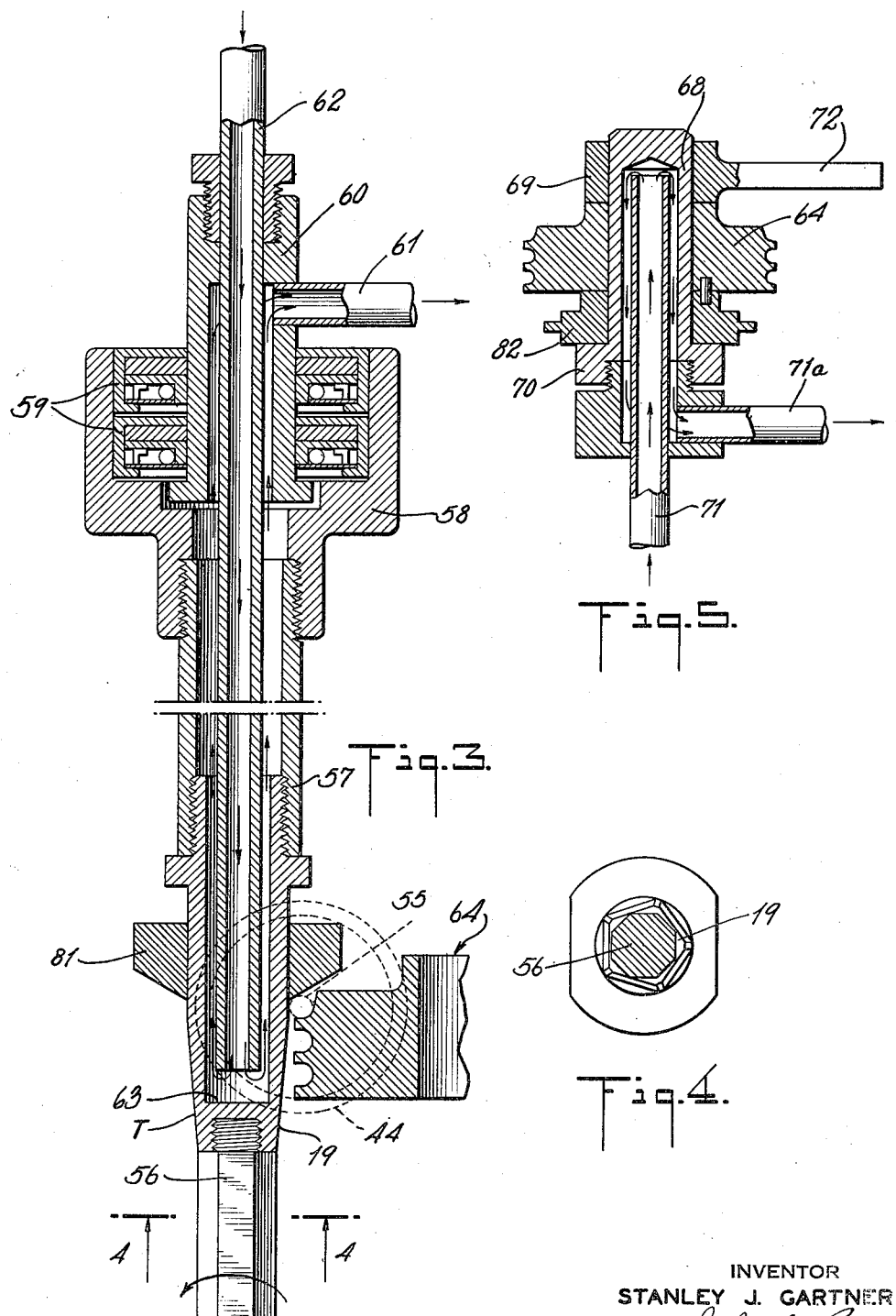

March 13, 1951 S. J. GARTNER 2,545,271
GLASS COILING MACHINE
Filed May 28, 1942 5 Sheets-Sheet 3
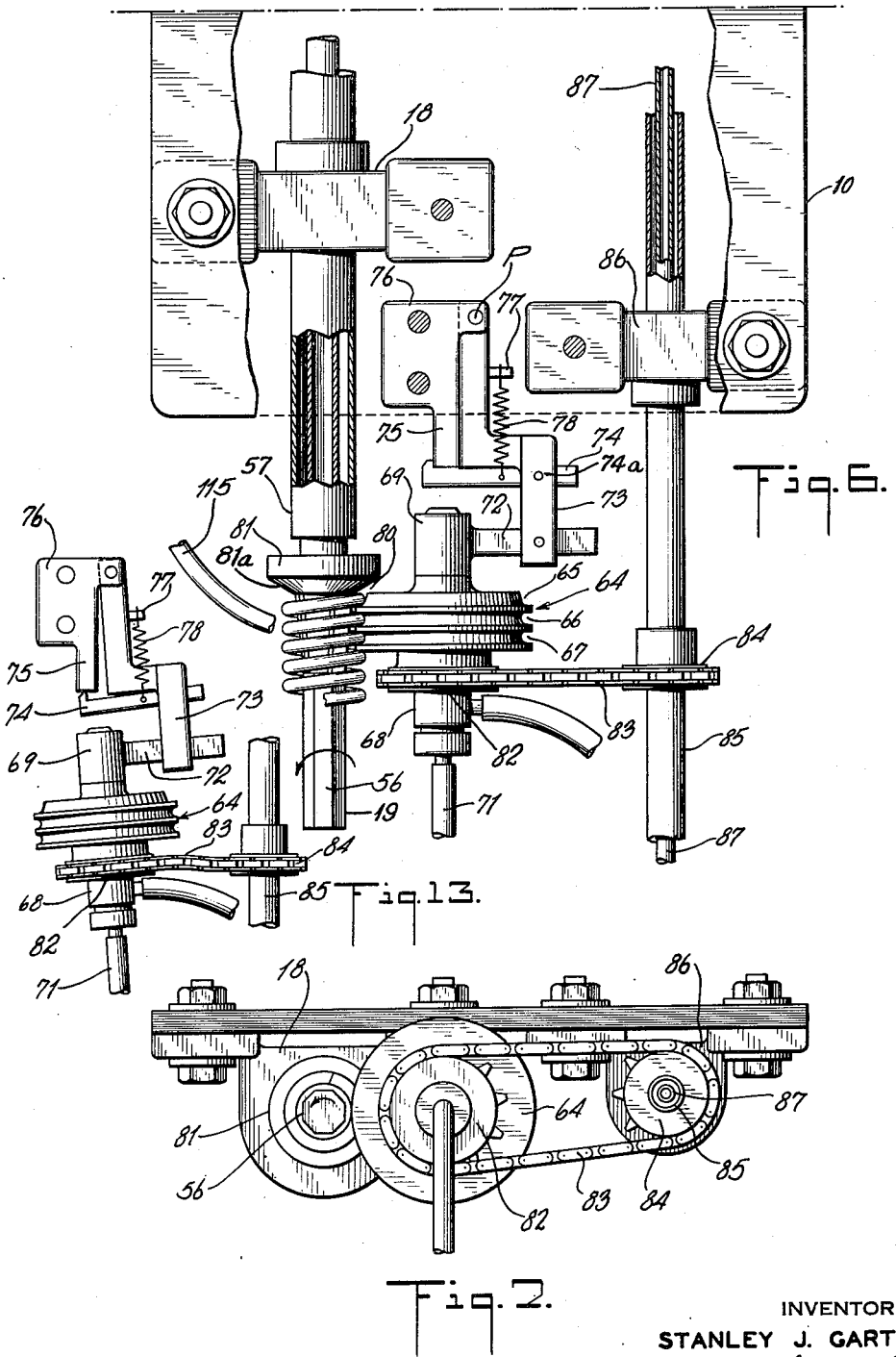
INVENTOR
STANLEY J. GARTNER
BY John J. Logan
ATTORNEY

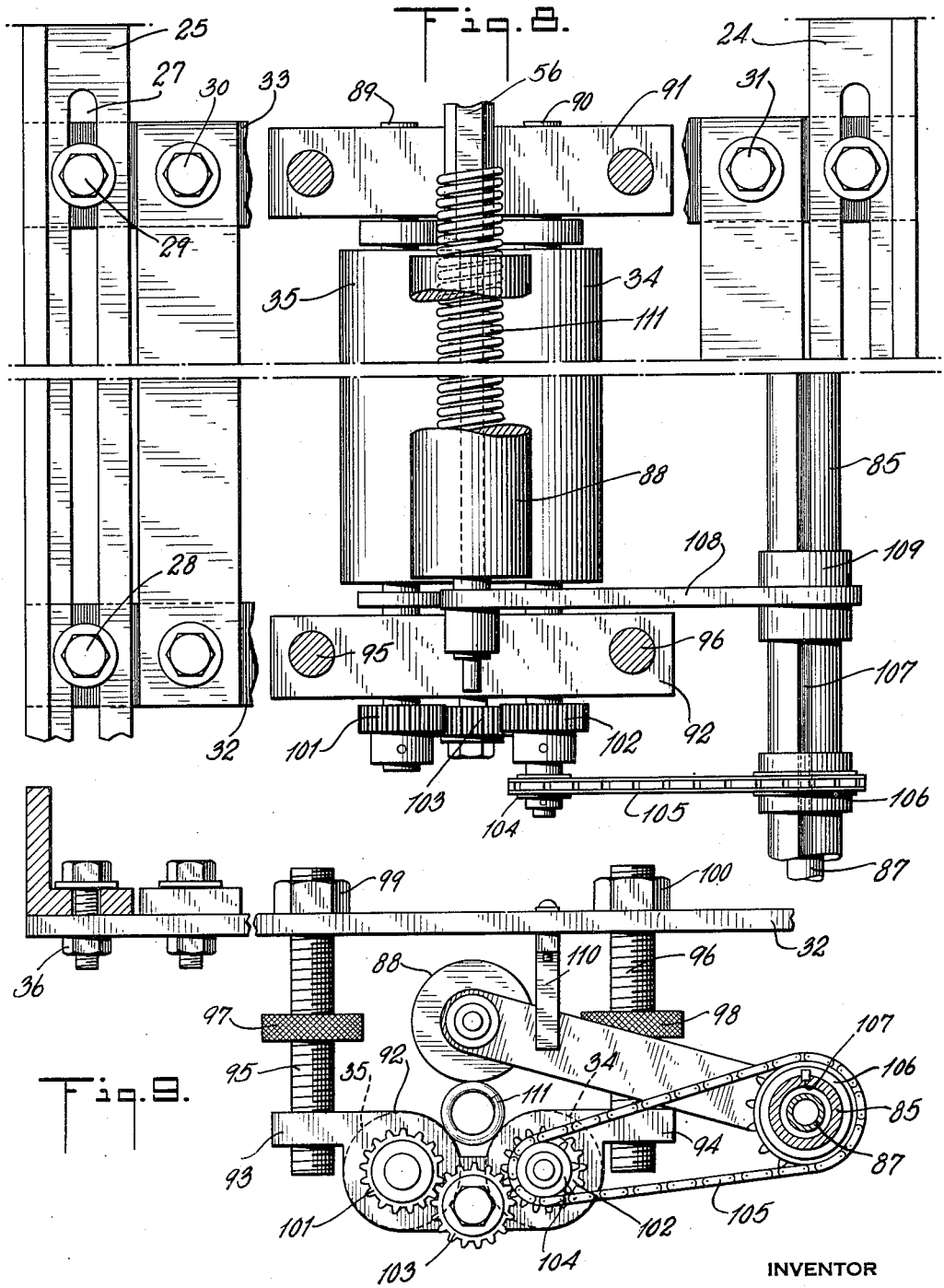

March 13, 1951  S. J. GARTNER  2,545,271
GLASS COILING MACHINE
Filed May 28, 1942  5 Sheets-Sheet 5
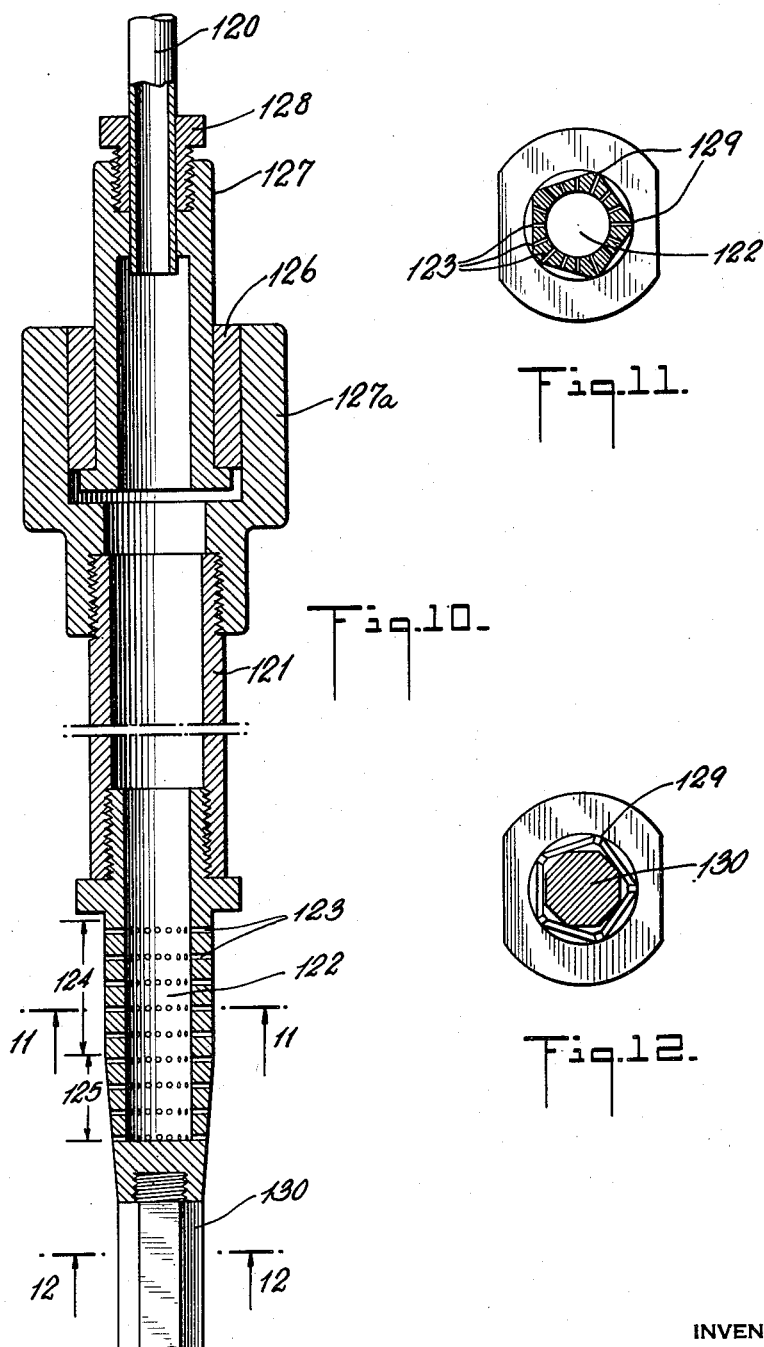
INVENTOR
STANLEY J. GARTNER
BY John J. Rogan
ATTORNEY Patented Mar. 13, 1951

2,545,271

UNITED STATES PATENT OFFICE 2,545,271

GLASS COILING MACHINE

Stanley J. Gartner, Emporium, Pa., assignor to Sylvania Electric Products Inc., a corporation of Massachusetts Application May 28, 1942, Serial No. 444,781

11 Claims. (Cl. 49—1)

This invention relates to glass coiling machines and in particular to machines for forming helical glass coils.

A principal object is to provide a machine for automatically winding and forming helical glass coils with a maximum of accuracy as regards electrical, mechanical and other characteristics, whereby coils of a high degree of uniformity can be produced in large quantities and with comparatively great rapidity.

Another object relates to an improved machine for automatically winding and forming glass coils with an accurate control of the inside diameter, outside diameter, and cross-sectional shape of the coil as a whole, as well as the cross-sectional shape and size of the individual coil turns and their pitch.

Another object is to provide a machine for automatically winding and forming glass coils which machine is easily convertible so as to produce coils of different cross section, size and pitch.

A feature of the invention relates to an automatic glass coil machine which is composed in general of three sections or units, namely a mandrel or coil forming unit, a glass supply and viscosity control unit and a coil receiving and supporting unit; the three units being adjustably correlated to provide the desired dimensions and configurations to the finished coil.

Another feature relates to improved cooling and driving arrangements for the forming mandrel of an automatic glass coiling machine.

Another feature relates to an improved coil receiving and supporting arrangement for an automatic glass coiling machine whereby undesired torsional forces are eliminated on the coil while it is undergoing formation in its viscous condition.

A further feature relates to the novel organization, arrangement and relative interconnection of parts which constitute an efficient automatic glass coiling machine.

Other features and advantages not specifically enumerated will be apparent after a consideration of the following detailed descriptions and the appended claims.

In the drawing which illustrates one preferred embodiment that has been found satisfactory in large scale manufacture of glass coils, Fig. 1 is a perspective view of the machine as a whole but with certain parts omitted for clarity.

Fig. 3 is an enlarged detail view, partly sectional, of the water cooled forming mandrel.

Fig. 4 is a section of Fig. 3 taken along the line 4—4 thereof.

Fig. 5 is an enlarged detail view partly sectional, of the coil forming wheel and its water cooled shaft arrangement.

Fig. 6 is a top-plan view of part of Fig. 1, showing parts in section, to illustrate more clearly the mandrel and coil forming mechanism.

Fig. 7 is a front-end elevational view of Fig. 6.

Fig. 8 is an enlarged detail view of the coil receiving and supporting unit of the machine.

Fig. 9 is a front-end elevational view of Fig. 8.

Fig. 10 is a view, largely in section, illustrating a modified forming mandrel with compressed air cooling.

Figures 1, 2:
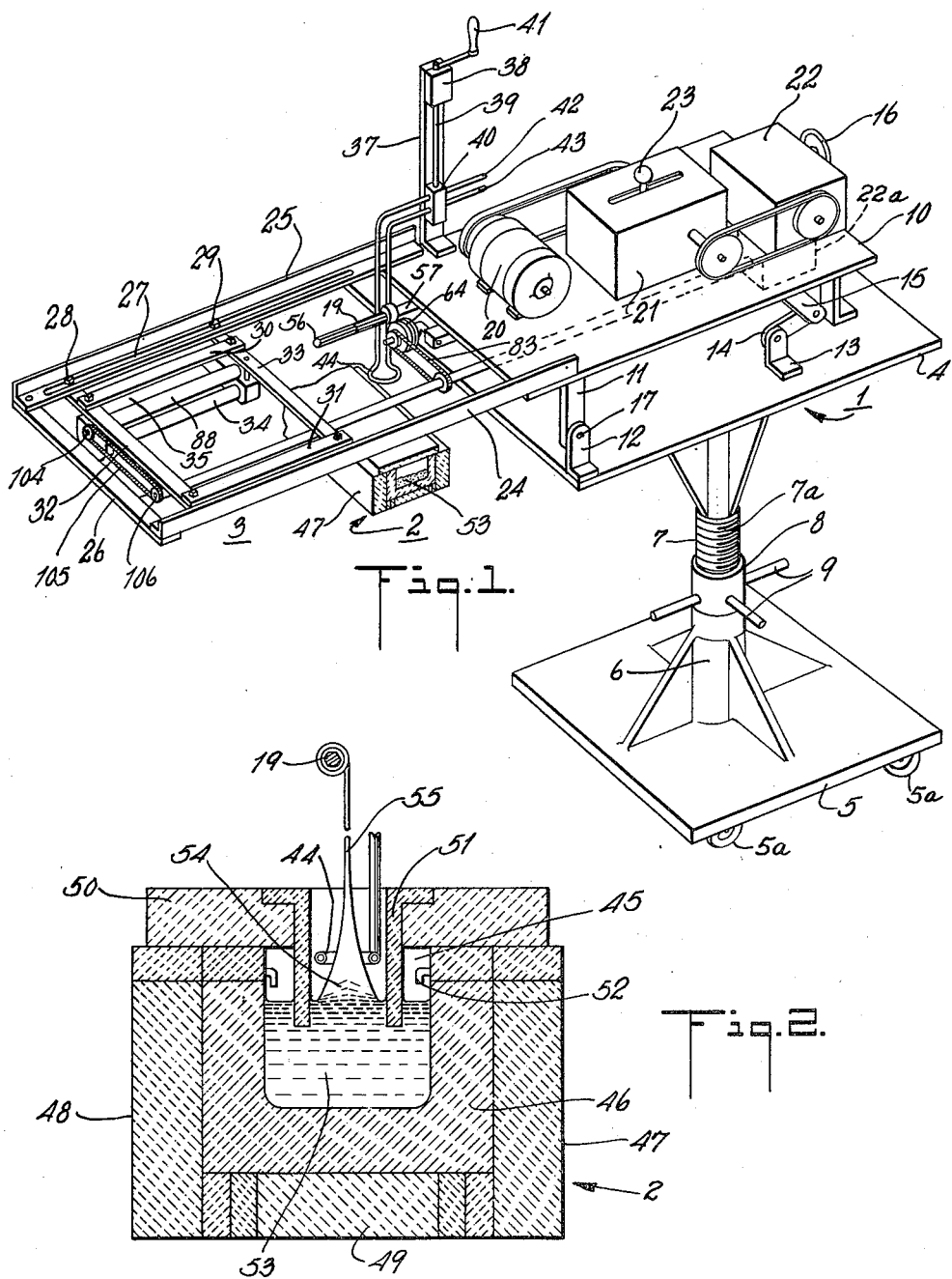
Fig. 2 is a detailed cross-sectional view of the glass supply and viscosity control unit of the machine.

Figs. 11 and 12 are respective sections of Fig. 10 taken along the line 11—11 and 12—12 thereof.

Fig. 13 is another view of part of Fig. 6 showing a different adjustment of the mechanism.

Referring to Fig. 1, the machine comprises in general three interrelated units 1, 2 and 3, designated respectively as the mandrel or coil forming unit; the glass supply and viscosity control unit; and the coil receiving and supporting unit. Units 1 and 3 are carried by a table 4 which is supported on a roller platform 5 borne on rollers 5a whereby the entire assembly may be laterally shifted upon the floor of the room or building in which the machine is operated. A vertically extensible pedestal 6 connects the table and roller platform. A vertically adjustable section 7 carries screw threads 7a mating with corresponding threads within collar 8 having integral arms 9. Thus by turning collar 8 the table 4 can be raised or lowered. Mounted in spaced relation above table 4 is a tiltable platform 10 which is supported at the forward corners of table 4 by bracket sections 11 and 12 which are pivotally united at 17. The opposite end of platform 10 is supported by an adjustable elevator comprising the fixed bracket 13 and the pivotally connected links 14 and 15. Links 14 and 15 are connected to an adjusting hand wheel 16 through suitable gearing (not shown) whereby turning of wheel 16 results in tilting of platform 4 around pivot 17. Thus the platform 10 which carries most of the moving mechanism can be adjusted to any desired position with respect to the glass supply unit 2.

Attached to the underface of platform 10 are bearing blocks, as block 18 in Fig. 6, in which are supported for rotation a hollow water cooled shaft having removably fastened at its forward end the glass coil winding and forming mandrel 19. The mandrel is coupled to the motor 20 through a variable speed transmission 21 and reduction gearing 22. A lever 23 controls the transmission 21 in any well-known manner.

Fastened to platform 10 are two channel guides 24, 25, which are united at their forward ends by cross piece 26. The horizontal side of each of the guides 24, 25, has an elongated slot 27 through which pass the bolts 28, 29, attached to a roller bed frame consisting of members 30—33. This frame carries a set of rollers 34 and 35, which receive the formed coil as it leaves the mandrel end 19 and the frame is adjustable along the guides 24, 25, to suit different mandrels and can be locked in position by nuts 36.

Also supported on platform 10 is a bracket 37 having at its upper end a threaded block 38 through which passes the threaded shaft 39 carrying at its lower end a block 40 slidably keyed to the vertical arm of the bracket 37. Thus by turning the handle 41, the block 40 can be raised and lowered. Fastened in, and extending through, block 40 are two metal supply pipes 42, 43, which are bent downwardly at right angles to extend below the table 4 and are formed to circular shape constituting a cooling coil 44 which lies in a substantially horizontal plane and substantially directly beneath the mandrel 19.

The foregoing described mechanism which is carried by member 5 is arranged so that the coil 44 is substantially central above a molten glass supply trough 45 (Fig. 2) into which molten glass is fed. This trough may consist of a sillimanite member 46 which is heat-shielded on its bottom and side walls by members 47, 48 and 49 and by a sillimanite cover plate 50 having a central opening into which is fitted a sillimanite tubular shield 51 arranged in vertical coaxial alignment with coil 44. Gas burners 52 extend through the wall of the trough to maintain the glass 53 in a molten condition. The molten glass is adapted to be withdrawn as an "onion" 54 tapering to a viscous filament or "pull" 55 of the desired diameter. The coil 44 surrounds the "pull" adjacent the "onion" to control the viscosity thereof. Shield 51 protects the "onion" and "pull" from the direct heat of the burners 52. This arrangement provides a temperature differential wherein the glass at lower levels is at a high temperature and the surface glass within shield 51 is at a lower temperature, thereby making the surface glass more viscous than the bulk of supply 53.

One of the important requirements of the machine is that certain parts be maintained cool by flowing water, compressed air or the like. Thus, the winding mandrel which is shown in detail in Fig. 3 consists of a coil forming section 19 which has its surface slightly fluted longitudinally of the mandrel to provide relatively sharp edges which "bite" into the viscous "pull" 55 to take hold thereof as it is continuously withdrawn from the molten glass supply 53; and then upon contraction of the coiled "pull" it will retain the grip. The mandrel adjacent the initial forming section is slightly tapered along its axis as shown at T to allow for shrinkage of the formed glass coil which contracts upon cooling, and this taper in the mandrel also permits releasing of the coil when it has cooled sufficiently to retain its shape. The forward end of the mandrel terminates in a solid octagonal rod 56 to receive and support the coil as it is fed along the mandrel.

The mandrel assembly is threaded into the forward end of a hollow rotating shaft 57 which in turn is threaded into a collar 58 containing packing material 59 to prevent water leakage between the rotating shaft 57 and the stationary port assembly 60 and water tube 61. Tightly fitted into the end of assembly 60 is a hollow metal tube 62 which extends throughout the entire length of the hollow shaft 57 and through the mandrel. Tube 62 terminates adjacent the closed mandrel end 63 so that the water flows in the direction of the arrows. The shaft 57 is provided with a suitable pulley or gear (not shown) whereby it can be rotated under control of motor 20, speed changer 21 and reduction gearing 22 (Fig. 1).

For the purpose of shaping and feeding the glass coil, there is provided a grooved wheel 64 (Figs. 3, 5 and 6) which has a plurality of peripheral grooves 65, 66, 67. Wheel 64 is mounted for rotation around the stationary hollow bearing shaft 68 but is prevented from longitudinal movement by collars 69 and 70. A metal tube 71 is positioned within the shaft 68 and a water outlet tube 71a communicates with the space between 68 and 71 so that the cold water circulates in the direction of the arrows. By this arrangement, wheel 64 is mounted adjacent the coil forming section of the mandrel and it can be adjusted relatively to the mandrel to accommodate the beginning of the winding and to correspond with mandrels of different size. Thus the wheel 64 and its shaft 68 are carried by a swingable doubly off-set member 73 which is fastened to arm 72 on collar 69. Member 73 is pivotally mounted at P and carries a latch 74 which is pivoted at 74a on member 73 and is connected by spring 78 to the pin 77 also carried by member 73. Wheel 64 is thus capable of being locked in its normal running position as shown in Fig. 6 by engagement between latch 74 and projecting lug 75 forming part of the rigid stop member 76 carried by table 10. To facilitate the beginning of the winding operation, the latch 74 is disengaged from lug 75 permitting the wheel 64 to be moved slightly away from the mandrel as indicated in Fig. 13. In this position, the chain 83 sags slightly but does not become disengaged from the associated sprockets. When the winding has been properly started, the wheel 64 is moved back to its normal running position where it is locked by latch 74 as above described. For the purpose of preventing molten glass collecting at point 80 and for guiding the "pull" 55 during the formation of its initial turn, there is fastened to the mandrel a wheel 81 having an inclined surface 81a facing the wheel 64.

Wheel 64 has fastened thereto a sprocket 82 which is in engagement with sprocket chain 83 driven by another sprocket 84 fastened to hollow driving shaft 85. Shaft 85 is mounted in suitable bearing brackets, as bracket 86 in Fig. 6, depending from platform 10 and is water cooled by an inner fixed water tube 87 which extends almost the entire length of shaft 85 which is closed at its forward end to provide for water circulation in somewhat the same manner as described in connection with Fig. 3. Shaft 85 is coupled to reduction gearing 22 for drive by motor 20 at a predetermined speed in relation to mandrel 19 by means such as a gear box 22a which in Figure 1 appears below gear box 22. Since, therefore, motor 20 drives, as before mentioned, the variable speed gear box 23 and the reduction gearing 22 and the mandrel 19 is coupled to the reduction gearing 22, the coupling of shaft 85 through gear box 22a to reduction gearing 22 results in shaft 85 and mandrel 19 being driven in a fixed time relationship with one another.

For the purpose of receiving and supporting the hardened coil as it leaves the mandrel, the mandrel end extends adjacent a set of three rollers 34, 35, 88 (Figs. 8 and 9). The rollers 34 and 35 have their shafts 89, 90, supported for rotation in end bearing blocks 91, 92. These bearing blocks have integral threaded lugs 93, 94, engaging bolts 95, 96, which are threaded through cross pieces 32, 33. Fastened to bolts 95, 96, are thumb nuts 97, 98, which can be turned to raise and lower the bearing brackets and rollers 34, 35. Nuts 99 and 100 lock the members 95, 96 in adjusted position. The forward ends of roller shafts 89, 90, carry gears 101, 102, which mesh with an idler gear 103. Also removably attached to shaft 90 is a sprocket 104 engaged by a sprocket chain 105. Chain 105 engages another sprocket 106 which is slidably keyed to hollow water cooled shaft 85 so that it is maintained in rotation during any adjusted position of the roller bed frame. It should be noted that shaft 85 is provided with a keyway 107 at its forward portion where it extends below the roller bed. The roller 88 is a floating one and is carried by a lever 108 attached to a hub 109 loosely surrounding the shaft 85. A pair of spaced downwardly depending guides 110 may be fastened to member 32 to enable the roller 88 to be moved as a unit with the rollers 34 and 35 when the roller bed is adjusted on the guides 24, 25. Thus roller 88 can freely ride on the top of the finished glass coil 111 and is independent of the particular size of coil which is wound. By means of members 97 and 98, the three rollers can be adjusted to correspond with the size of coil which is being wound. As above mentioned, the roller bed is adjustable along guides 24 and 25 so that the rollers receive the hardened glass coil 111 as it leaves the mandrel end 56, it being understood that roller 88 is initially lifted out of the way in order to start the coil between the rollers whereupon roller 88 is allowed to rest upon the coil.

The manner of operation of the machine is substantially as follows. With the glass supply 53 in molten state, the platform 5 is moved into place so that the coil 44 is substantially concentric above shield 51. Handle 41 is then turned to lower the coil 44 into the shield 51 until it is the proper distance above the surface of the molten glass supply 53. The water supply flows through the coil 44 and through the various shafts above described to maintain them cool. In the meanwhile the roller bed frame 30—33 has been adjusted along guides 24, 25, so that the ends of the rollers 34, 35 and 88 are adjacent the mandrel end 56. Then a "bait" in the form of a working iron is introduced into the molten glass supply 53 throughout which a proper viscosity gradient has been established. The filament or "pull" 55 is drawn upwardly from the molten glass to the mandrel 19 adjacent the inclined surface of wheel 81 at the point 80 as indicated in Figs. 3 and 6. The grooved stripping and forming wheel 64 is adjusted into position and in the meanwhile motor 20 has been started to cause rotation of the mandrel whose speed can be regulated by the speed changer 21. The glass filament is wrapped around the mandrel at the point 80 and when it first makes contact with the mandrel its viscosity is sufficiently increased to enable the glass to take the shape of the mandrel. The multi-faceted surface of the mandrel (see Fig. 4) provides added friction to insure continuous transfer of the turning movement of the mandrel to the glass filament. The wheel 64 provides thrust along the mandrel for feeding the coil along the mandrel. The water cooling of the mandrel in conjunction with wheel 64 and an air stream through pipe 115 (Fig. 6), cools the glass sufficiently to prevent adjacent sides of the coils from sticking together. As the hardened glass coil is fed off the reduced end of the mandrel, it is engaged between the rollers 34, 35 and 88, which continuously support and remove the coil and convey it to a suitable hopper or other receptacle. It should be noted that by means of members 11—16 the mandrel can be adjusted to any desired angular relation with respect to the filament 55 to control the pitch of the formed coil, within limits established by the spacing between the first two grooves in wheel 64 and by the thickness of the "pull" to be coiled.

Instead of employing a water cooled mandrel, a mandrel with compressed air cooling may be employed such as shown in Figs. 10 to 12, wherein the compressed air entering at port 120 circulates through the hollow shaft 121 to chamber 122 whence it exits through a series of small vent openings 123. The portion 124 of the mandrel is the initial winding portion while the portion 125 of the mandrel is of reduced diameter to allow for contraction of the hardened glass coil as above described. Bushing 126 in collar 127a prevents air leakage during the rotation of shaft 121 while the port assembly 120, 127, 128, remains stationary. The shaft 121 is provided with a pulley or gear (not shown) whereby it may be driven from the motor 20 as above described in connection with Figs. 1 and 3. The mandrel is removably threaded into the internally threaded end of shaft 121 so that different size mandrels can be readily replaced for forming coils of different internal diameters. As shown in the cross-sectional view of Fig. 11, the mandrel surface is fluted longitudinally of its axis (see Fig. 12) to provide relatively sharp edges 129 in order that the glass will take hold and can be drawn from the molten glass batch 53 (Fig. 2) and then upon contracting will retain its grip on the mandrel. The reduced end of the mandrel has threaded therein an octagonal solid rod 130 which supports the hardened coil as it slides from the end of the mandrel. The compressed air which passes through the perforations 123 tends to cool the glass as it is being coiled and prevents the sides of adjacent coils from sticking together.

With the foregoing arrangements, it is possible to form glass coils of any desired inside diameter, outside diameter, cross-sectional shape of the coil proper and cross-sectional shape and size of the individual coiled turns and their pitch.

Various changes and modifications may be made without departing from the spirit and scope of the invention.

What I claim is:

1. A machine of the character described comprising a glass coiling mandrel having a free end over which the coiled glass travels and a plurality of rollers adjacent said free end, and having axes parallel to said mandrel to receive and support the hardened glass coil as it leaves said mandrel, and motor means for rotating said mandrel and said rollers in fixed speed relation.

2. A machine according to claim 1 in which said rollers are carried by a roller bed which is mounted for movement toward and away from said mandrel.

3. In a mechanism of the character described, a glass coiling mandrel unit, a glass supply unit including a viscosity control device for providing a vertical "pull," and pivotal means to support said mandrel unit at a desired angle with respect to the glass "pull" to control the pitch of the formed glass coil.

4. In combination, a trough containing a molten supply of glass, a cooling coil adapted to be positioned adjacent the surface of said supply and to surround a viscous glass "pull" withdrawn vertically from the surface of said supply, a support carrying a mandrel for coiling said "pull" therearound, said support also carrying driving mechanism for said mandrel, means carried by said support for raising and lowering said coil with relation to said supply and "pull," and means to tilt said support to adjust the angular relations between said mandrel and said "pull."

5. A mechanism according to claim 4 in which said support is mounted on another support which is capable of adjustment in two mutually perpendicular planes.

6. In a mechanism of the character described, a mandrel for coiling a viscous glass filament, a support for rotatably supporting said mandrel at one end, driving means for said mandrel carried by said support, a pair of parallel guides extending from said support substantially parallel to said mandrel and beyond the end of said mandrel, a roller bed slidably adjustable on said guides, said bed including a plurality of rollers between which the hardened glass coil is adapted to pass, said rollers being adjustably supported to accommodate different sizes of coils.

7. A mechanism according to claim 6 in which said support is in the form of a tiltable platform whereby said roller bed and said mandrel can be adjusted as a unit to vary the angular position thereof with respect to the viscous glass filament.

8. A mechanism according to claim 6 in which said support is in the form of a tiltable platform carrying a driving motor and a speed changer coupled to the mandrel shaft and to said rollers.

9. In a mechanism for winding glass coils, a winding mandrel having one free end from which the glass coil leaves the mandrel, and means to receive and support the coil as it leaves the mandrel, the last-mentioned means including a slidably adjustable frame carrying a pair of rollers the axes of which are parallel to said mandrel, and beyond the free end of said mandrel and a swingable lever carrying a third parallel roller which freely rests on said coil.

10. A mechanism according to claim 9 in which said pair of rollers are supported in bearings which are mounted for vertical adjustment beneath said frame.

11. An apparatus for forming a glass helix including a mandrel for forming a viscous glass "pull" into a coil, a coil feed control wheel adjacent said mandrel, means to rotate said mandrel and wheel at a predetermined ratio, hollow shafts for said mandrel and wheel respectively, and means to flow a cooling medium through said shafts to prevent adhesion of the viscous glass "pull" to said mandrel and wheel, said coil feed control wheel and the shaft therefor being pivotally mounted with respect to said mandrel to facilitate starting of the winding of a coil, and a latching mechanism for locking said wheel in its normal running position adjacent said mandrel after the beginning of the winding.

STANLEY J. GARTNER.

REFERENCES CITED

The following references are of record in the file of this patent:

UNITED STATES PATENTS

| Number | Name | Date |
| --- | --- | --- |
| 498,835 | Atterbury | June 6, 1893 |
| 797,189 | Farber | Aug. 15, 1905 |
| 1,139,872 | James | May 18, 1915 |
| 1,230,367 | Barber, Jr. | June 19, 1917 |
| 1,439,855 | Westbury | Dec. 26, 1922 |
| 1,829,429 | Woods | Oct. 27, 1931 |
| 1,922,426 | Fahrney | Aug. 15, 1933 |
| 1,953,502 | Reimers | Apr. 3, 1934 |
| 2,021,276 | Weinhart | Nov. 19, 1935 |
| 2,239,055 | Sawyer | Apr. 22, 1941 |
| 2,296,321 | Wellech | Sept. 22, 1942 |
| 2,329,164 | Stuckert et al. | Sept. 7, 1943 |
| 2,342,609 | Ellefson | Feb. 22, 1944 |
| 2,402,924 | Snyder | June 25, 1946 |